United States Patent
Johns et al.

(10) Patent No.: US 10,212,238 B2
(45) Date of Patent: Feb. 19, 2019

(54) SELECTING A CONTENT PROVIDING SERVER IN A CONTENT DELIVERY NETWORK

(71) Applicant: Level 3 Communications, LLC, Broomfield, CO (US)

(72) Inventors: Kevin Christopher Johns, Erie, CO (US); Joseph Cajetan Lawrence, Boulder, CO (US); Joelle T. Maslak, Golden, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 470 days.

(21) Appl. No.: 14/137,151

(22) Filed: Dec. 20, 2013

(65) Prior Publication Data

US 2014/0344331 A1    Nov. 20, 2014

Related U.S. Application Data

(60) Provisional application No. 61/823,536, filed on May 15, 2013.

(51) Int. Cl.
| | |
|---|---|
| *H04L 29/08* | (2006.01) |
| *H04L 12/715* | (2013.01) |
| *H04L 12/751* | (2013.01) |
| *H04L 29/12* | (2006.01) |
| *H04L 12/725* | (2013.01) |

(52) U.S. Cl.
CPC .............. *H04L 67/16* (2013.01); *H04L 45/02* (2013.01); *H04L 45/64* (2013.01); *H04L 67/32* (2013.01); *H04L 67/322* (2013.01); *H04L 45/04* (2013.01); *H04L 45/302* (2013.01); *H04L 61/1511* (2013.01)

(58) Field of Classification Search
CPC ....................................................... H04L 67/16
USPC ......................................................... 709/203
See application file for complete search history.

(56) References Cited

U.S. PATENT DOCUMENTS

| | | | |
|---|---|---|---|
| 6,052,718 A | | 4/2000 | Gifford |
| 8,102,775 B2 * | | 1/2012 | Thubert ............ H04L 29/12207 370/238 |
| 8,422,502 B1 * | | 4/2013 | Alaettinoglu ........... H04L 45/38 370/392 |

(Continued)

OTHER PUBLICATIONS

International Search Report, dated Oct. 10, 2014, Int'l Appl. No. PCT/US14/038166, Int'l Filing Dated May 15, 2014; 3 pgs.

(Continued)

*Primary Examiner* — Joseph L Greene

(57) ABSTRACT

Aspects of the present disclosure involve systems, methods, computer program products, and the like, for managing the distribution of content from a content distribution network (CDN). In general, the system receives a request for content from the CDN from a user of the network and determines a server within the CDN to provide the content to the user. In addition, the system of the present disclosure may determine a preferred server or group of servers from which the content is provided to the user. This preference may be based on information received from a Border Gateway Protocol feed or Interior Gateway Protocol feed and one or more business determinations, such as the cost of providing the content through the CDN and particular egress port associated with the CDN.

20 Claims, 6 Drawing Sheets

(56) References Cited

U.S. PATENT DOCUMENTS

| | | | | |
|---|---|---|---|---|
| 8,868,452 | B2* | 10/2014 | Parmar | G06Q 10/0637 |
| | | | | 705/28 |
| 2007/0067424 | A1 | 3/2007 | Raciborski et al. | |
| 2009/0144390 | A1 | 6/2009 | Previdi et al. | |
| 2012/0290693 | A1* | 11/2012 | Karasaridis | H04L 61/1511 |
| | | | | 709/222 |
| 2013/0094498 | A1* | 4/2013 | Wittenschlaeger | H04L 45/12 |
| | | | | 370/355 |
| 2014/0250471 | A1* | 9/2014 | Guerra | H04N 21/43615 |
| | | | | 725/82 |

OTHER PUBLICATIONS

Written Opinion of the International Searching Authority, dated Oct. 10, 2014, Int'l Appl. No. PCT/US14/038166, Int'l Filing Dated May 15, 2014; 5 pgs.

International Preliminary Report on Patentability, dated Nov. 17, 2015, Int'l Appl. No. PCT/US14/38166, Int'l Filing Date May 15, 2014; 7 pgs.

Extended European Search Report, dated Nov. 30, 2016, Application No. 14797911.6, filed May 15, 2014; 6 pgs.

\* cited by examiner

SELECTING A CONTENT PROVIDING SERVER IN A CONTENT DELIVERY NETWORK

CROSS-REFERENCE TO RELATED APPLICATIONS

This application claims priority under 35 U.S.C. § 119(e) to U.S. Provisional Application No. 61/823,536 entitled "SYSTEM AND METHOD FOR SELECTING A CONTENT PROVIDER IN A CONTENT DELIVERY NETWORK", filed on May 15, 2013 which is incorporated by reference in its entirety herein.

TECHNICAL FIELD

Aspects of the present disclosure generally relate to content distribution and delivery in a network, and more particularly to processing or otherwise manipulating routing of content in a content delivery network, and more specifically for a selecting a content provider in a content delivery network based on one or more business considerations or policy.

BACKGROUND

Content Delivery Networks (CDN) are increasingly used to distribute content, such as videos, multimedia, images, audio files, documents, software, and other electronic resources, to end users on behalf of one or more content providers. Using a CDN allows the content providers to increase the speed and reliability of content delivery without deploying additional infrastructure. Moreover, the end users obtain the content with fewer delays. However, many CDNs are generally not configured to consider business considerations or agreements when delivering content to an end user.

Typically, a CDN includes several content servers from which the content can be supplied to a requesting end user. To decrease latency and increase performance, a CDN will attempt to provide the content from a content server that is separated by as little network infrastructure as possible from the requesting device, with particular emphasis on low latency. Thus, if a request is received at the CDN from an end user in Denver, Colo., the CDN will attempt to determine which content-providing server provides the least number of network elements between the server and the end user. However, the nearest content server to a requesting device is not always the most cost effective for the CDN. For example, providing the content from the lowest latency content server may send the content over a third party network that requires a significant cost to the CDN. In another example, even if the content server is geographically near the requesting user, the server may not be logically near the end user, such that no path between the CDN and the end user exists without traversing points far from the CDN and the end user. Such circumstances may exact an unnecessary usage cost or performance impact for the CDN. Therefore, by utilizing only those content servers that are geographically near the requesting end user, the CDN is not as efficient and cost-effective as possible.

It is with these and other issues in mind that various aspects of the present disclosure were developed.

SUMMARY

One implementation of the present disclosure may take the form of a method for providing a source of content distribution from a content distribution network. In one embodiment, the method comprises the operations of receiving a request for content from a requesting device associated with a content distribution network, obtaining a Border Gateway Protocol (BGP) feed of route information, the BGP feed comprising at least one Internet Protocol (IP) address associated with at least one network external to the content distribution network, creating a first policy rule for selecting a source device within the content distribution network for providing content to the requesting device based at least on the BGP feed of route information and identifying a source device within the content distribution network for providing the requested content to the requesting device based on at least the one first policy rule.

Another implementation of the present disclosure may take the form of a content distribution network. The content distribution network comprises a plurality of content servers and a content distribution network Domain Name Server (DNS). The DNS is configured to receive a request for content from a requesting device associated with an external network to the content distribution network and access a database configured to store a Border Gateway Protocol (BGP) feed of route information, the BGP feed comprising at least one Internet Protocol (IP) address associated with the requesting device. Further, the DNS is configured to analyze the BGP feed of route information, including an available bandwidth indicator of the at least one egress port to determine at least one egress port from the content distribution network to the external network, create a first policy rule for selecting one of the plurality of content servers for providing content to the requesting device based at least on the BGP feed of route information and select the one of the plurality of content servers within the content distribution network for providing the requested content to the requesting device based on the at least one first policy rule and the subset of content distribution servers that are topologically close to an egress point.

Yet another implementation of the present disclosure may take the form of a system for operating a content distribution network. The system includes a domain name server. The domain name server comprises a processor and a computer-readable medium associated with the processor. The computer-readable medium includes instructions stored thereon that, when executed by the processor, cause the domain name server to perform the operations of receive a request for content from a requesting device associated with an external network to a content distribution network, obtain Border Gateway Protocol (BGP) feed of route information associated with the external network, the BGP feed comprising at least one Internet Protocol (IP) address associated with the requesting device and an egress address from the content distribution network to the external network associated with the at least one IP address and determine at least one business rule associated with the at least one egress port, the business rule indicative of a business consideration for transmitting content through the at least one egress port. In addition, the processor is configured to create a first policy rule for selecting one of the plurality of content servers for providing content to the requesting device based at least on the business consideration associated with the at least one egress port and select a content provider within the content distribution network for providing the requested content to the requesting device, wherein the selection of the content provider is based at least on the first policy rule.

DETAILED DESCRIPTION

Figure 1:
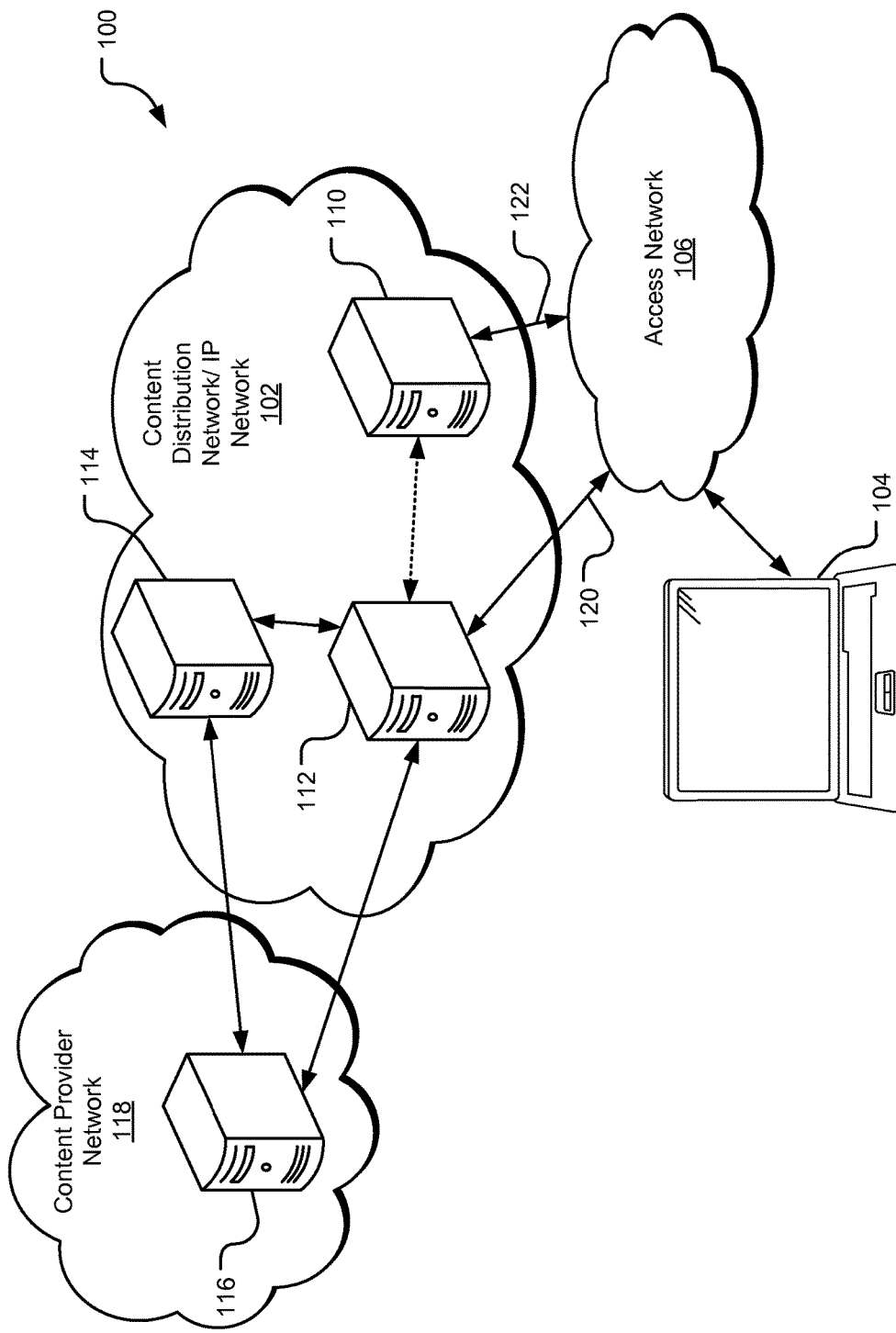
FIG. 1 is an example network environment for distributing content over a content delivery network (CDN).

Aspects of the present disclosure involve systems, methods, computer program products, and the like, for managing the distribution of content from a content distribution network (CDN). In general, the system receives a request for content from the CDN from a user of the network and determines a server or content providing component within the CDN to provide the content to the user. In addition, the system of the present disclosure may determine a preferred server or group of servers from which the content is provided to the user. This preference may be based on any metric of the CDN, such as geographical location to the user, current or past performance of one or more components of the CDN or one or more business determinations, such as the cost of providing the content from the various servers of the CDN, quality of service of the content signal, active measurement of the network path and/or one or more business agreements entered into by the operator of the CDN.

In one particular embodiment, a domain name system (DNS) server or other component of the CDN may be configured to obtain, store and/or analyze information contained in a Border Gateway Protocol (BGP) signal related to one or more of the available transmission routes of the CDN to select the preferred server or group of servers (referred to herein as "server cluster" or "cluster") to provide the requested content. In general, a BGP feed (or BGP session or BGP data) is a table of Internet Protocol (IP) prefixes which designate network connectivity between autonomous systems (AS) or separate networks. BGP information for a network route may include path, network policies and/or rule-sets for transmission along the path, among other information. The BGP feed may also include Interior Gateway Protocol (IGP) information for network routes within an AS or network and/or other network information that pertains to the transmission of content from the CDN. Other network specific information may also be obtained by the CDN. For example, a quality of service for a content signal provided by one or more components of the CDN may be obtained. As explained in more detail below, the BGP information from the BGP feed is provided to one or more network components for use in selecting a server of the CDN to provide content to a requested device or network.

The CDN may use several sources of information when selecting a content server to provide the content to the end user. In one example, the CDN may determine the server or cluster that provides the lowest latency in relation to the requesting device (or related Internet Service Provider (ISP) through which the content is requested by the requesting device). To determine the lowest latency providing server, the server may perform a "ping" function or utilize a locator database, as described in more detail below. However, providing content from a content server with the lowest latency to the requesting IP may not provide the CDN with the lowest cost or take into consideration one or more business agreements of the CDN operator. For example, providing the content from the lowest latency content server may send the content over a third party network that requires a significant cost to the CDN. In another example, providing the content from the lowest latency content server may not provide a requested quality of service for the content to the end user.

Thus, in one embodiment of the present application, the CDN DNS server or other CDN component may be configured to account for one or more business considerations, rules or agreements when selecting the providing server. Such information may be based at least on the information obtained from the BGP feed received at the CDN DNS server. For example, a particular server or cluster of the CDN may be undesirable to the operator of CDN for providing content to a user because providing content from that particular server is costly. Such a situation may arise if the route through which the content is provided utilizes a costly third party network over another less costly type of network. In another example, one or more business agreements may be in place that determine which CDN DNS server is selected from which the content is provided. For example, the CDN operator may enter into an agreement to provide a specific level of quality of service to the content signal, such as a high-definition audio or video signal. In another example, the end user may request a specific content network or server from which the content is provided such that the request is fulfilled by the CDN operator. Thus, in some situations, the CDN may analyze one or more business rules when providing content from a server or cluster in the CDN to the requesting device, even if a closer server cluster or route is available. The identification of routes through the CDN may be obtained through the BGP feed information, as explained in more detail below. With the identification of the routes and the components of the CDN, a content provider server and/or route may be selected taking into account one or more business considerations or rules.

Similarly, BGP feed, including IGP information, can be utilized by the CDN to obtain a more accurate estimation of the CDN topology. This information may aid the CDN in selecting a content provider based on a business consideration, such as a route that minimizes the transmission cost through the CDN network, in addition to the topology information obtained through the ping function described above. In this manner, through the received BGP information, the CDN can apply one or more policies based on business considerations of providing content through the CDN, rather than merely providing the content from the server that is deemed to provide the lowest latency.

FIG. 1 is an example network environment 100 for distributing content to one or more users. In one implementation, a CDN 102 is communicably coupled to one or more access networks 106. In general, the CDN 102 comprises one or more content servers (discussed in more detail below) configured to provide content upon a request and an underlying IP network through the request is received and the content is provided. The underlying IP network associated with the CDN servers may be of the form of any type IP-based communication network configured to transmit and receive communications through the network. In this manner, CDN servers may be added to an existing IP-based communication network such that the CDN servers receive a request for content and provide the content to the requesting device through the supporting IP network. For simplicity, the use of the term "CDN" throughout this disclosure refers to the combination of the one or more content servers and the underlying IP network for processing and transmitting communications, unless otherwise noted.

The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and 122. These access points may be geographically separate and/or logically separate. Thus, the user device 104 may access the CDN 102 through either of the access points 120, 122. Further, the access network 106 may include any number of access points to facilitate communication with the CDN 102. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address within an IP network) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content.

In one implementation, the CDN 102 includes an edge server 112, which may cache content from another server to make it available in a more geographically or logically proximate location to the user device 104. The edge server 112 may reduce network loads, free capacity, lower delivery costs, and/or reduce content download time. The edge server 112 is configured to provide requested content to a requestor, which may be the user device 104 or an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

Figure 2:
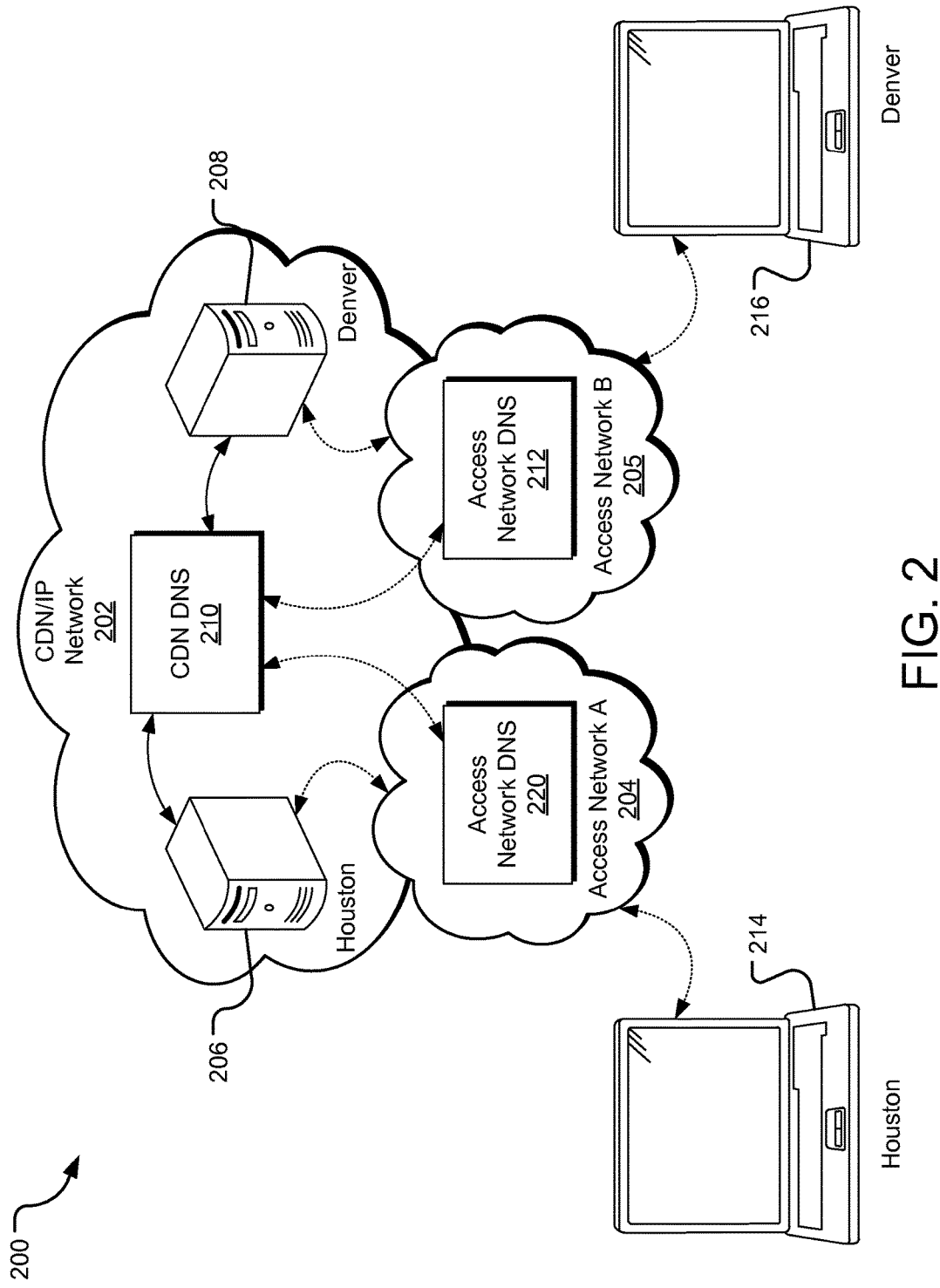
FIG. 2 is an example network environment for distributing content to a plurality of users of the CDN.

FIG. 2 is an example network environment for distributing content to a plurality of users of the CDN. Many of the components outlined above with reference to the network of FIG. 1 are similarly included in the network of FIG. 2. In the network 200 of FIG. 2, however, users from separate external networks (shown in FIG. 2 as access networks 204, 205) may request content from the CDN 202. As described in more detail below, it is often advantageous to select a server of the CDN 202 to provide the content to the requesting user based on at least one business consideration.

The network environment 200 of FIG. 2 includes one or more content delivery networks (CDN) 202 for delivery of content from one or more content providers to end-users. The CDN 202 (or more accurately, the IP network associated with the CDN) is communicably coupled to one or more access networks (illustrated in FIG. 2 as access network A 204 and access network B 205) that provide access to the Internet for end-users and/or content providers and is similar or the same as the CDN described above with reference to FIG. 1.

The one or more CDNs 202 may each have CDN storage servers located in various locations (both physical and logical), for example, a Houston server cluster 206 and a Denver server cluster 208, for storing one or more files of content provided by the CDN. Such server clusters may include a single server or one or more racks of servers. The network environment 200 may further include servers or other storage devices on the client/subscriber side of the access networks 204 providing the opportunity to retrieve content without having to communicate with storage devices across the access networks 204. Each such storage device may be shared amongst proximally located end-users, for example, via wired access or a wifi access point.

In one implementation, the CDN 202 includes a CDN domain name system (DNS) server 210 that is communicably coupled to the Houston server cluster 206 and the Denver server cluster 208, for example, across the Internet. The CDN DNS 210 includes one or more directory servers that determine at least one appropriate CDN server for delivering requested content to end-users. In one implementation, each access network 204, 205 may include an access network DNS 212, 220 having one or more directory servers, as described herein. The access network DNS 212, 220 is configured to interact with the CDN DNS 210 to provide end-users of the access network 204, 205 access to the CDN 202 to request and retrieve content.

To determine the appropriate CDN server for delivering a requested content to an end user, the CDN DNS 210 may maintain one or more databases (not shown) that store information concerning the CDN network and/or one or more routing rules based on a routing policy. For example, the database may include a general topology of the CDN as related to an underlying IP network, cost for utilizing one or more of the access networks associated with the CDN and/or one or more algorithms to aid in selecting a content server based on a business consideration of the network. As explained in more detail below, this information may be utilized by the CDN DNS 210 to select an appropriate server cluster to provide requested content to a user of the system 200.

In one particular example, a request may be received at the IP network of the CDN 202 through an access network 205 from a device located in Denver 216. In particular, the end device 216 transmits a request to the access network DNS 212 for the particular access network 205 associated with the end device. The access network DNS 212 communicates with the CDN DNS 210 through the IP network to determine which server cluster (cluster 206 or cluster 208) from which the content is provided to the end user device 216. In this case, it may be advantageous to the performance of the CDN network 202 and in light of one or more business considerations to provide the content from the Denver-based content servers 208 over the Houston-based server cluster 206. Thus, the CDN DNS 210 returns an IP-address for the Denver-based content servers 208 to the access network DNS 212. The access network DNS 212 then returns the IP-address for the Denver-based content servers 208 to the end user device 216 so that the end user device connects to the Denver-based content servers through the user's access network 205. A similar series of operations may occur in the access network A 204, access network DNS 220 and the Houston-based servers 206 in response to a request from a Houston-based end device 214. Further still, as explained in more detail below, a Houston-based server cluster 206 may be selected to provide the content to an end user 216 in Denver, or vice versa, in response to one or more business considerations, rules or agreements.

In many instances, it may not be appropriate or cost effective to simply select the server cluster that provides the lowest latency to the requesting device. Rather, one or more business considerations may make it advisable to provide the content from a server cluster (and thereby a particular egress port of the underlying IP network) that is not the closest cluster to the requesting device. For example, a situation may arise that an underlying IP network of a CDN or access network is owned by a third party and is being leased by the operator of the CDN 202. Thus, it is generally less costly to provide content from another server cluster in the CDN 202 to the requesting device, even if the selected server cluster provides the content to the requesting device through another egress port of the IP network. In another example, access network A 204 may be a competing network operated by a third party while access network B 205 may be a network that provides favorable rates to the CDN 202. In this example, it is preferable to provide the content through access network B 205, if possible, to the end user to reduce the cost of transmitting the content to the user. In yet another example, the end user may affect the cost of providing the content through either access network A 204 or access network B 205, such as whether the end user is a customer of the access network through which the content is transmitted and/or whether any business agreements, such as quality of service and server location, are in effect between a CDN operator and an end user. Thus, in one embodiment of the system of the CDN discussed below, the CDN DNS 210 is configured to obtain routing information from one or more BGP feeds and other network information and utilize that information to select the preferred server cluster from which the content is provided that potentially overrides the lowest latency rule for the CDN. As mentioned above, the BGP information for the transmission routes associated with the CDN 202 may indicate the cost associated and distance traveled for transmitting content to the various access networks associated with the CDN. Further, the other network information provides one or more business agreements that may affect the selection of a content providing server. As such, with this information, one or more policy rules may be created and applied to the selection of the server cluster to provide the content in response to one or more business considerations, such as cost.

In addition to the business costs associated with providing the content through an access network, there may be some transmission cost associated with transmitting the content internally through the CDN. For example, CDN 202 of FIG. 2 includes server cluster 206, 208. Further, although not illustrated in FIG. 2, the CDN 202 may also include any number of other telecommunication components, such as routers, edge servers, directory servers and the like that one of ordinary skill in the art would recognize as being a component of a telecommunications network. These components may also include a transmission cost to the CDN 202 associated with the one or more components such that transmission of content through multiple components may be undesirable to the CDN. Thus, a cost-effective route for providing content from a server cluster to the egress port of the CDN IP network may also be identified by the CDN and applied when selecting a providing server cluster. As should be appreciated, the use of the term "cost" herein is not limited to strictly the monetary cost of providing content, but may also indicate the amount of network bandwidth used, the quality of the content signal, business relationships between networks and/or the network and customers and the like. Thus, although discussed herein as a "cost" or "business cost" to the CDN, any type of negative impact to the operation of the CDN operator business may be considered when discussing the cost to the CDN. For example, in some situations it may be preferable to the CDN or operator of the CDN to provide the content from a content server that has a higher monetary cost than another content server but provides a higher quality of service of the content signal. In another example, one or more business agreements may determine which content server provides the content. In these situations, the business considerations dictate that the higher monetary cost content server be selected by the CDN to provide the content to the end user.

Cost-effective or business-driven routes through a CDN can be determined by analyzing the CDN topology and determining which server cluster provides the best route for transmission of the content through the network based on any number of business considerations and rules. For example, by analyzing the topology of the network, the CDN may determine that a particular server cluster is logically closer to the egress point of the CDN IP network than another server cluster than is geographically closer to the end user. Selection of a server cluster that reduces the distance that the content is transmitted through the CDN may reduce the transmission cost to the CDN for providing that content. In one embodiment described in more detail below, the CDN may utilize Interior Gateway Protocol (IGP) information associated with one or more routes through the CDN to determine an estimated topology of the CDN. With this information, one or more policy rules may be applied to the selection of the server cluster to provide content to an end user.

Figure 3:
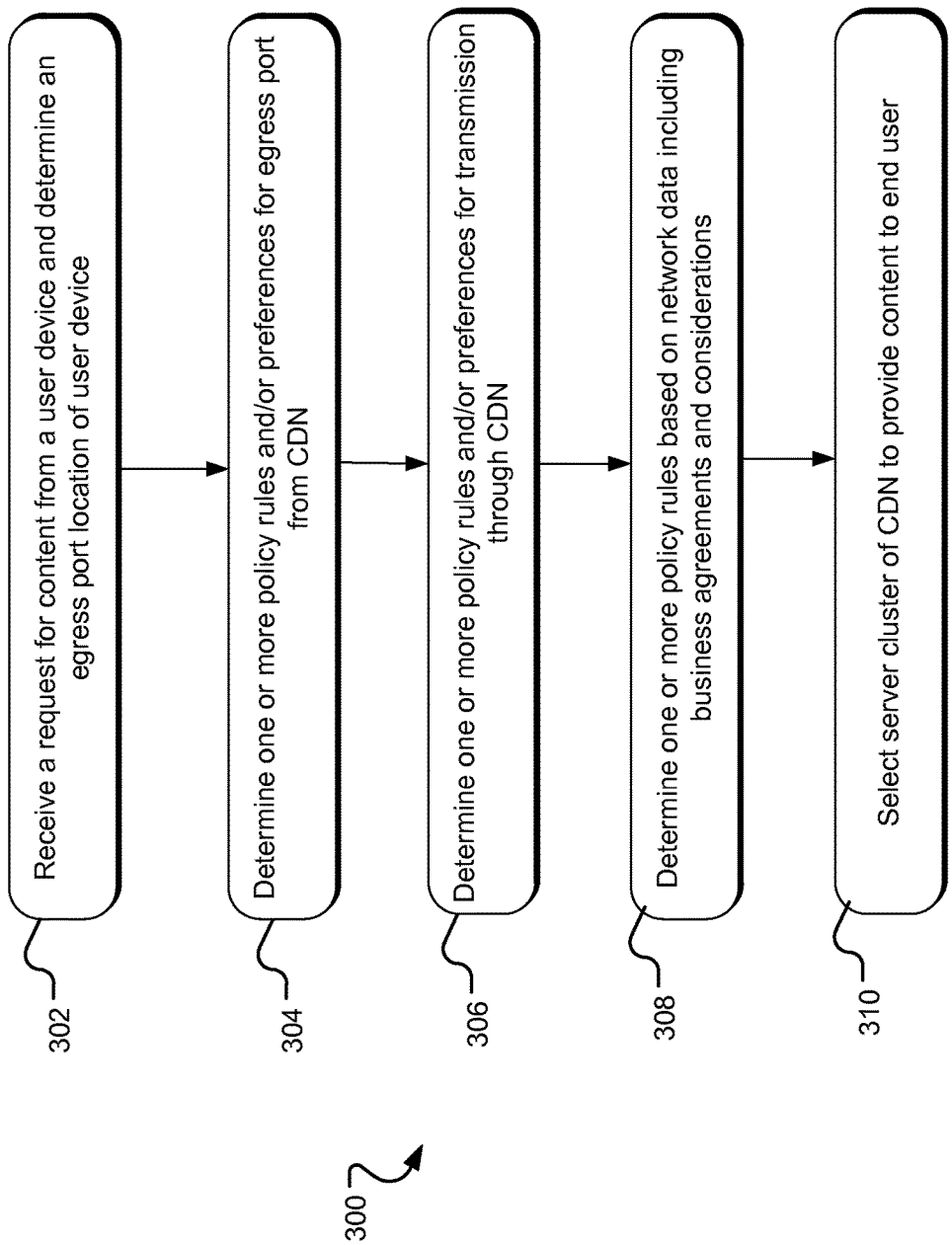
FIG. 3 is a flowchart illustrating a method for a CDN to obtain network topology information from a Border Gateway Protocol (BGP) feed and utilize the information to select a content provider.

FIG. 3 is a flowchart illustrating a method for a CDN to obtain network topology information from a Border Gateway Protocol (BGP) feed, an IGP feed and other network data (such as business agreements and considerations of the network) and utilize the information to select a content provider. In general, the operations of FIG. 3 may be performed by any component of the CDN or other telecommunications network. In one embodiment, the CDN DNS performs the operations of FIG. 3 to select one or more server clusters of the CDN to provide content to a requesting device associated with the CDN.

Beginning in operation 302, the CDN DNS receives a request for content from an end user device associated with the CDN. The request may be generated upon selection or entering of a link to the content in an Internet application. In one implementation, a CDN DNS receives a request for content, a content segment, or other resource from a user device. In addition to receiving the request, the CDN DNS may also, in operation 302, determine a general location of the egress port utilized by the user device relative to a content delivery network using conventional localization algorithms or techniques. In one embodiment, the location of the user device is determined through a ping operation or through one or more IP location databases. For example, utilizing the embodiment illustrated in FIG. 2, the Denver-based server cluster 208 may transmit a ping signal to access network DNS 212 and access network DNS 220 of the access network 204. The ping signal is an instruction that instructs the receiving device to return a ping response with general device information. Further, the time required for the ping signal to be returned may be determined by the transmitted device. In general, the closer the receiving device is to the transmitting device, the faster the ping signal is returned. In this manner, one or more server clusters within the CDN 202 can determine the relative location of one or more access network devices connected to the CDN network.

Other methods may also be employed to determine the egress location associated with a requesting device. For example, a geo-database may be provided to the CDN and stored for referral by the CDN. In general, the geo-database includes a list of IP addresses associated with the network and the geographic locations of the listed IP addresses. The geo-database may be provided by a third party or may be generated by the CDN 202. Another example includes an Autonomous System Number and/or country-state code that may be associated with one or more IP addresses. This information may also be provided by a third party or generated by the CDN 202. When a request for content is received by the CDN 202, the geo-database or other location information may be accessed by the CDN to estimate the geographic location of the requesting device. However, such information may be out of date or inaccurate as the location of IP addresses may change often. Also, such geo-data does not account for the logical topology of the CDN 202. For example, an IP address may be associated with a first location, but the CDN 202 must send the content to an egress point at a second location to provide the content to the end user. For these and other reasons, a combination of pinging and the geo-databases may be used to increase the accuracy of the location of a requesting device.

Returning to FIG. 3, in operation 304 the CDN DNS determines one or more policy rules for an egress port of the CDN associated with the end user. In particular, the CDN DNS utilizing the location of the end user determined above, determines one or more egress ports associated with the end user from the BGP feed and/or the cost associated with one or more transmission routes associated with the egress port. This information is processed by the CDN DNS in one or more algorithms to determine one or more policy rules associated with the one or more egress ports. In one embodiment, the CDN DNS computes a matrix of preferences and de-preferences based on the BGP feed information for a node in the CDN. These policy rules or matrix aid the CDN DNS in selecting a server cluster from which the content is provided to the user through an egress port based on any number of business considerations of the network. In the situation where only the access network of a requesting device is known, the policy rules or matrix may assume a particular cost to the network for providing content to every end user associated with that network. The operations of receiving the BGP feed information and analyzing such information is described in more detail below with reference to the method of FIG. 4.

In operation 304, the CDN DNS determines one or more policy rules for transmission through the CDN. In particular, the CDN DNS determines the egress port of the associated with the received request, an estimated topology for the CDN and the potential business cost associated with one or more transmission routes through the network to the egress port. In one embodiment, this information is included in an IGP feed that is provided to the CDN DNS. From this IGP feed, an estimated network topology of the CDN can be determined. Further, in operation 304, the CDN DNS processes the information through one or more algorithms to determine one or more policy rules and/or matrices of preferences associated with the one or more transmission routes through the CDN. These policy rules further aid the CDN DNS in selecting a server cluster from which the content is provided to the user based on one or more business considerations of the CDN. In addition, the policy rules created in operation 304 may be combined with the policy rules created in operation 302 to create the preference matrix. The operations of receiving the IGP feed information and analyzing such information is described in more detail below with reference to the method of FIG. 5.

The CDN DNS also determines one or more policy rules based on other network data in operation 308. In one particular embodiment, the CDN may receive or otherwise obtain network data. The network data may include, but is not limited to, capacity information of the network, the quality of signal provided from one or more components of the CDN, business agreements entered into between the CDN operator and an end user and/or third party network, the potential monetary cost for transmitting content over a particular route through the CDN, and the like. Other information may also be considered, such as latency data, geographical location and the like. In general, any type of information concerning the network that is known or obtainable by the CDN operator may be considered by the CDN when creating the policy rules in operation 308. One or more types of this information may be included in the BGP feed discussed above with relation to operation 304. Also, similar to the policy rules described above, the policy rules created in operation 306 may be combined with the policy rules created in previous operations to create the preference matrix that may be utilized when determining a server cluster from which the content is provided to a user.

In operation 310, the CDN DNS analyzes the policy rules for the egress port or ports determined in operation 304, the policy rules for transmission through the CDN determined in operation 306 and the network data in operation 308 and selects a server cluster of the CDN from which the content is provided to the end user device. As should be appreciated, the selection of a server cluster determines through which egress port of the CDN IP network the content is provided to the requesting device. In one embodiment, the application of the policy rules is utilized to reduce the cost to the CDN or operator of the CDN of providing the content to the user. In another embodiment, the application of the policy rules is utilized to provide content to the end user in response to one or more business rules or agreements of the CDN operator. In yet another embodiment, the network information is placed into a preference matrix that is utilized when determining a server cluster from which the content is provided to a user.

In some circumstances, the selected server cluster is the server cluster that is geographically closest to the end user device. However, as explained above, circumstances may exist that make providing the content from the geographically closest server cluster uneconomical for the CDN. For example, a particular egress port for the CDN may include a high cost to transmit content through the access network associated with the egress port. Thus, selecting a server cluster that uses a different egress port and/or access network may be appropriate to reduce the cost of providing the content. Similarly, the general topology of the CDN may not be considered if a selection of the server cluster with the lowest latency is the only consideration. Thus, in one example, an analysis of the CDN topology may be utilized to reduce the transmission distance of the content through the CDN. In another example, one or more business rules may be applicable to the CDN such that the selection of a content providing server is in response to one or more business relationships or agreements. Through these mechanisms, the CDN DNS can provide the content to the user based on business considerations, such as monetary cost, network processing and/or business agreements to the CDN.

As should be appreciated, the algorithms utilized by the CDN DNS to select a server cluster may be varied in the application of both access network cost, interior network topology and business agreements or network structure. For example, it is not required that the CDN DNS select the server cluster that provides the absolute lowest cost for transmission of the content. Rather, the CDN DNS may apply a threshold value to the analysis to determine when a low latency server cluster is bypassed for another server cluster. In particular, the low latency server cluster may be selected, unless providing the content from that server cluster exceeds a particular monetary cost or transmission processing cost. In another example, a particular egress port is identified as being congested or otherwise operating outside of a normal operating range. In this example, the CDN DNS may utilize that information concerning the egress port to select a server cluster that utilizes a separate egress port to reduce the possibility of the content being delayed in transmission.

In addition, the algorithm used by the CDN DNS to select the server cluster may consider other features of the networks involved. For example, the CDN may provide preferential selection to some server clusters based on a promised or expected quality of service. Thus, the selected server may not be the nearest server cluster, but one that is identified as having the highest quality of service or quality of service that meets an expectation of the end user. Similarly, the algorithm may give preference to one access network over another per an agreement between the network operators. Still further, a server cluster may be selected based on the type of content provided by the CDN, such as video or data content. In general, the algorithm used by the CDN DNS to select a server cluster to provide content to an end user device may consider any information concerning the CDN or associated network, including information obtained through a BGP feed or IGP feed and/or subscriber information to the CDN.

Figure 4:
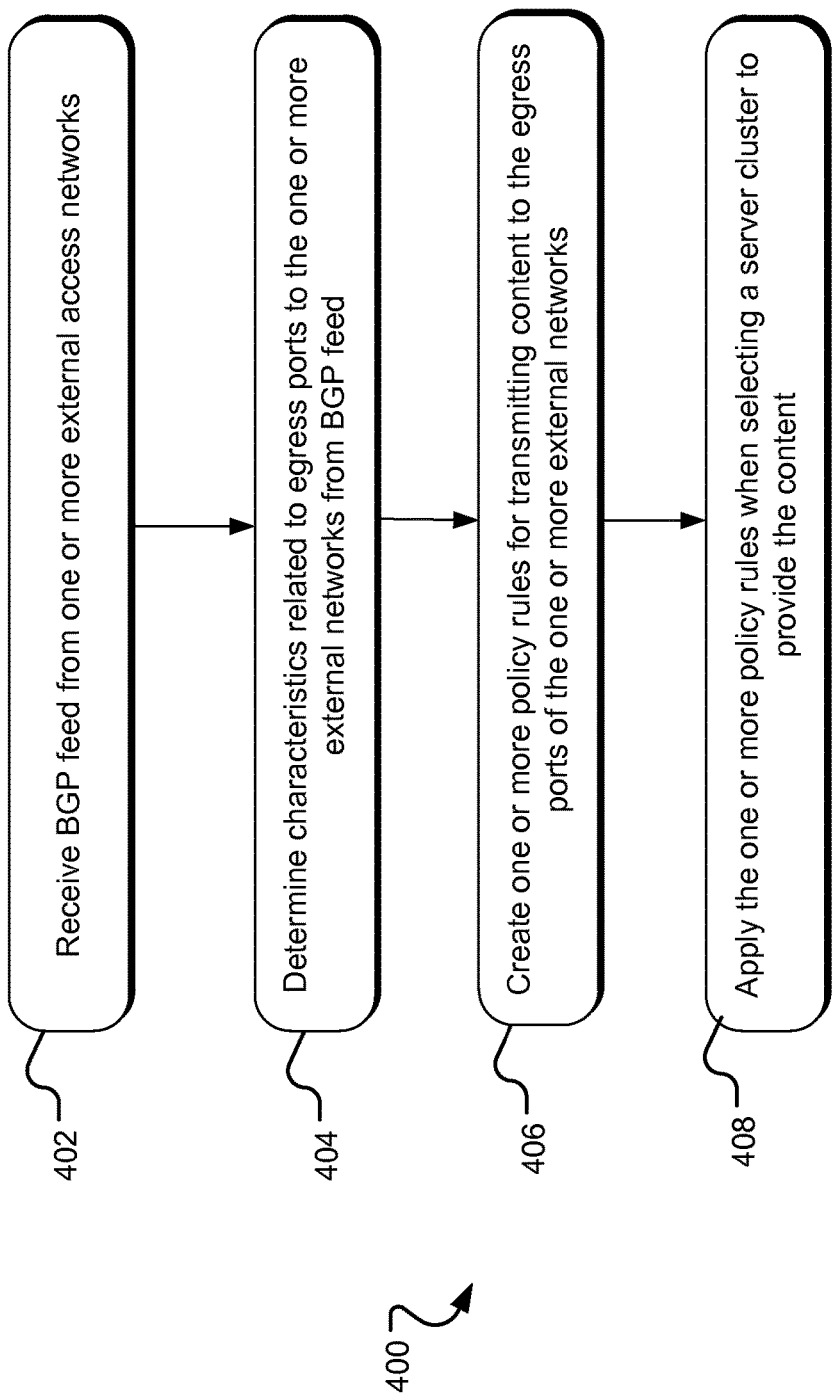
FIG. 4 is a flowchart illustrating a method for a CDN to obtain external network topology information from a BGP feed and utilize the information to determine and apply one or more policy decisions on selecting a content provider.

As mentioned above, the CDN may utilize a BGP feed to obtain information concerning one or more access networks associated with the CDN, as well as information concerning the egress ports from the CDN to the access networks. FIG. 4 is a flowchart illustrating a method for a CDN to obtain external network topology information from a BGP feed and utilize the information to determine and apply one or more policy decisions on selecting a content provider. The operations of FIG. 4 relate to operation 304 described above with relation to FIG. 3. Thus, the operations of FIG. 4 may be performed by the DNS of the CDN or any other component of the CDN.

Beginning in operation 402, the CDN receives a BGP feed from one or more external access networks associated with the CDN. Using the network of FIG. 2 as an example, the CDN 202 receives a BGP feed from access network A 204 and access network B 205. This information may be gathered routinely from the access networks to adjust to changes occurring within the access networks. In addition, the CDN may store the information received for reference when selecting a server cluster to provide content to an end user within the access networks.

In operation 404, the CDN analyzes the BGP feed information to determine one or more characteristics for one or more egress ports associated with the access networks. In particular, the BGP feed from the access networks may include a list of IP addresses that are associated with each access network and the egress ports from the CDN to each access network. In addition, the CDN may obtain cost information related to each access network, such as whether the access network is a costly third party network. In one embodiment, the cost information may be incorporated into the BGP feed through the use of BGP communities. BGP communities are tags applied to prefixes in the BGP of a route. The tags describe attributes concerning the processing of the route and may be set programmatically or through a manual override command. Thus, attributes for a particular egress port or route through the CDN can be included in a BGP for the route through the use of the BGP community. With the BGP information and other information associated with the access networks, the DNS can determine which IP addresses are associated with which access network, which egress ports are associated with each access network and a cost associated with transmitting content through the egress ports. Other information may also be associated with the BGP feed, such as the traffic capacity related to each egress port. Such egress port characteristics may be stored or otherwise maintained by the CDN for aid in selecting a server cluster.

Once the information from the BGP feed is gathered, the CDN creates one or more policy rules for the amount of content transmitted to at least one of the identified egress ports of the one or more access networks in operation 406. As mentioned above, some access networks are more costly to the CDN to transmit content through. For example, access network A 204 may provide a high cost of transmitting content through if the end user device 214 is a not a customer of access network A. Thus, for requests for content received from access network A 204 from a user device 214 that is not identified as a customer of access network A, the CDN may create one or more policy rules that override the nearest logical server cluster as the server to provide the content. Rather, if the end user device can be serviced through another access network, the CDN may choose to select a server cluster that may be further away from the end user device, but may cost less to provide the content. The selection of a server cluster different than the nearest server cluster may occur through the application of one or more policy rules associated with the access network and/or egress port. Thus, the policy rule created in operation 406 of FIG. 4 may be created in response to the information obtained through operations 402 and 404.

In another example, an egress port may be identified as being congested at a particular time of day. Thus, if a request for content is received behind that egress port at the noted time of day, the CDN may create a policy rule that selects a different egress port from which to provide the content to the end user device. Similarly, the BGP feed may indicate a bandwidth or availability of an egress port, from which one or more policy rules may be created. Other considerations that may cause the CDN to create one or more policy rules include quality of service, type of content provided and/or preferential customers to the CDN. In general, however, by using the information obtained from the BGP feed, the CDN can create certain policy rules that allow for the selection of a server cluster with consideration to the business costs associated with providing that content through a particular egress port and/or access network to the end user.

Once the policy rule or rules are created by the CDN, the rules are applied to the selection of a server cluster to provide content to an end user in operation 408. In one embodiment, to apply a policy rule, the CDN may apply a community tag to the BGP information that contains IGP metrics associated with a particular egress port that control the processing of packets through the egress port. In another embodiment, the CDN may apply the policy rule at the CDN DNS when selecting a server cluster to provide the content. In general, the CDN DNS would store the policy rule and associate the policy rule to a certain subset of egress ports such that the transmission of content through those egress ports would be affected by the policy rule. In any event, application of the policy rule to the routes associated with one or more egress ports of the CDN allows the CDN to select a server cluster that accounts for one or more business considerations when providing the content.

Figure 5:
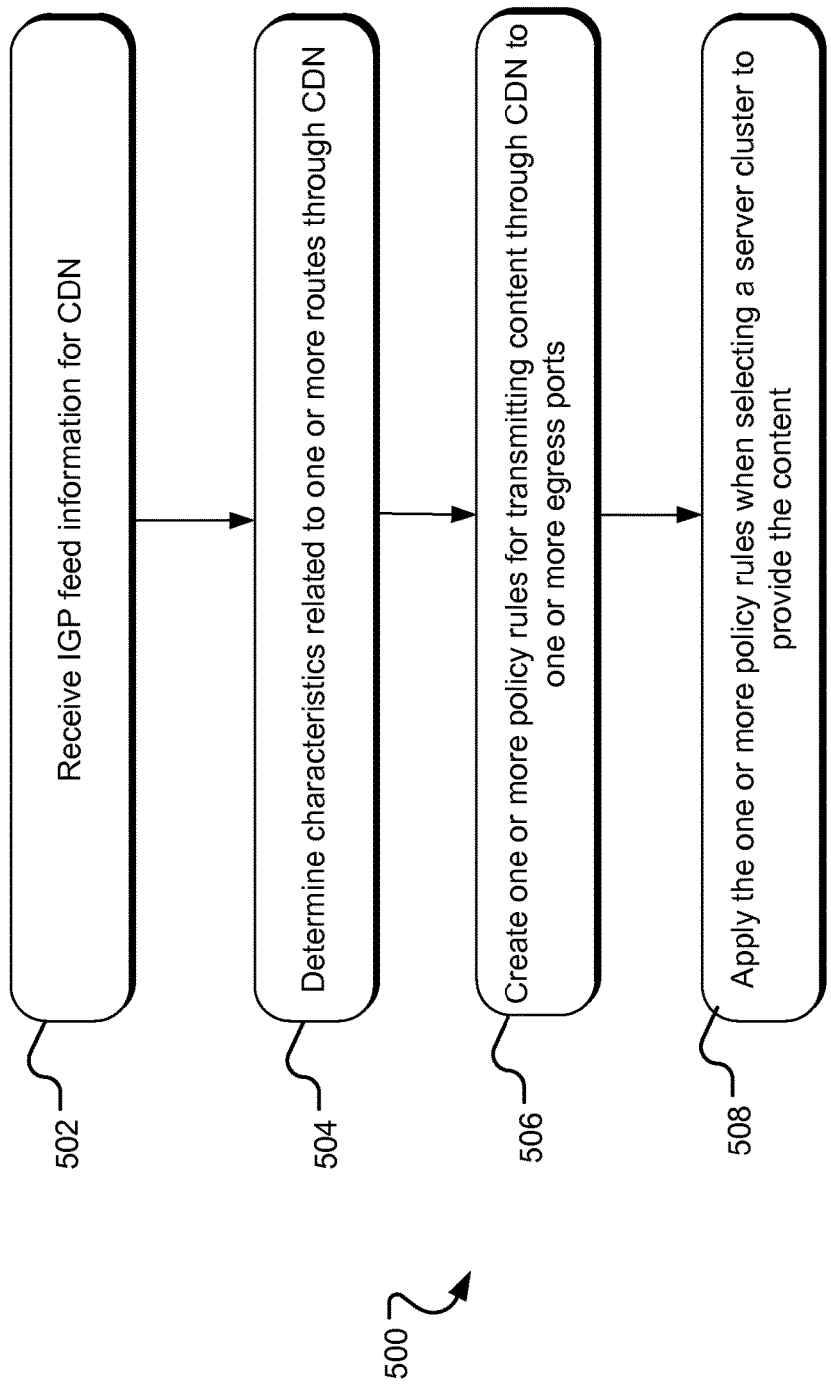
FIG. 5 is a flowchart illustrating a method for a CDN to obtain internal network topology information from an Interior Gateway Protocol (IGP) feed and utilize the information to determine and apply one or more policy decisions on selecting a content provider.

In addition to creating one or more policy rules for selecting a server cluster based on the access networks and/or egress ports, the topology of the CDN itself may be considered to create one or more additional policy rules. For example, the CDN may utilize an IGP feed to obtain information concerning routing information through the CDN. As explained above, the IGP is a protocol used by the CDN to define routes through the CDN. Thus, the IGP would include the route from a particular server cluster to a particular egress port in the CDN. This routing information may be utilized by the CDN to create one or more policy rules for selecting a particular server cluster to provide content to an egress port. FIG. 5 is a flowchart illustrating a method for a CDN to obtain internal network topology information from an IGP feed and utilize the information to determine and apply one or more policy decisions on selecting a content provider. The operations of FIG. 5 relate to operation 306 described above with relation to FIG. 3. Thus, the operations of FIG. 5 may be performed by the DNS of the CDN or any other component of the CDN.

Beginning in operation 502, the CDN receives IGP information for one or more routes through the CDN. This information may describe a route that content may be transmitted through the CDN, such as from a server cluster to an egress port of the network. Further, the IGP information may include which server clusters utilize which egress ports of the CDN and the location of the server clusters. In addition, the CDN may store the information received for reference when selecting a server cluster to provide content to an end user through one or more of the egress ports of the CDN.

Thus, in operation 504, the CDN determines one or more characteristics related to one or more of the routes identified through the IGP information. For example, the CDN may determine that providing content from a particular server cluster to a particular egress port requires the content to be transmitted across a wide region of the CDN. Thus, in one embodiment, the CDN may determine that such a route is undesirable to the operation of the CDN if the content can be provided from a server cluster that is logically nearer the egress port. In this manner, the routes through the CDN for providing the content may be characterized and/or categorized based on the impact to the CDN.

In operation 506, the CDN creates one or more policy rules for transmitting content through the CDN. Similar to the policy rules described above with reference to FIG. 4, the policy rules created in operation 506 may utilize one or more business considerations, such as distance traveled through the CDN. Thus, in one embodiment, the policy rules attempt to limit the distance the content is transmitted through the CDN to reduce the load on the network. Other policy rules may account for the cost of providing content from high-traffic server clusters or through high-traffic transmission sites. Regardless of the aim of the policy rules, the rules are created with one or more business considerations in mind.

Once the policy rule or rules are created by the CDN, the rules are applied to the selection of a server cluster to provide content to an end user in operation 508. Similar to operation 408 of FIG. 4, the application of the policy rules in operation 508 may be done through a community tag to the IGP information associated with a particular route and/or during selection of a server to provide the content. In general, application of the policy rule to the routes through the CDN allows the CDN to select a server cluster that accounts for one or more business considerations when providing the content.

Figure 6:
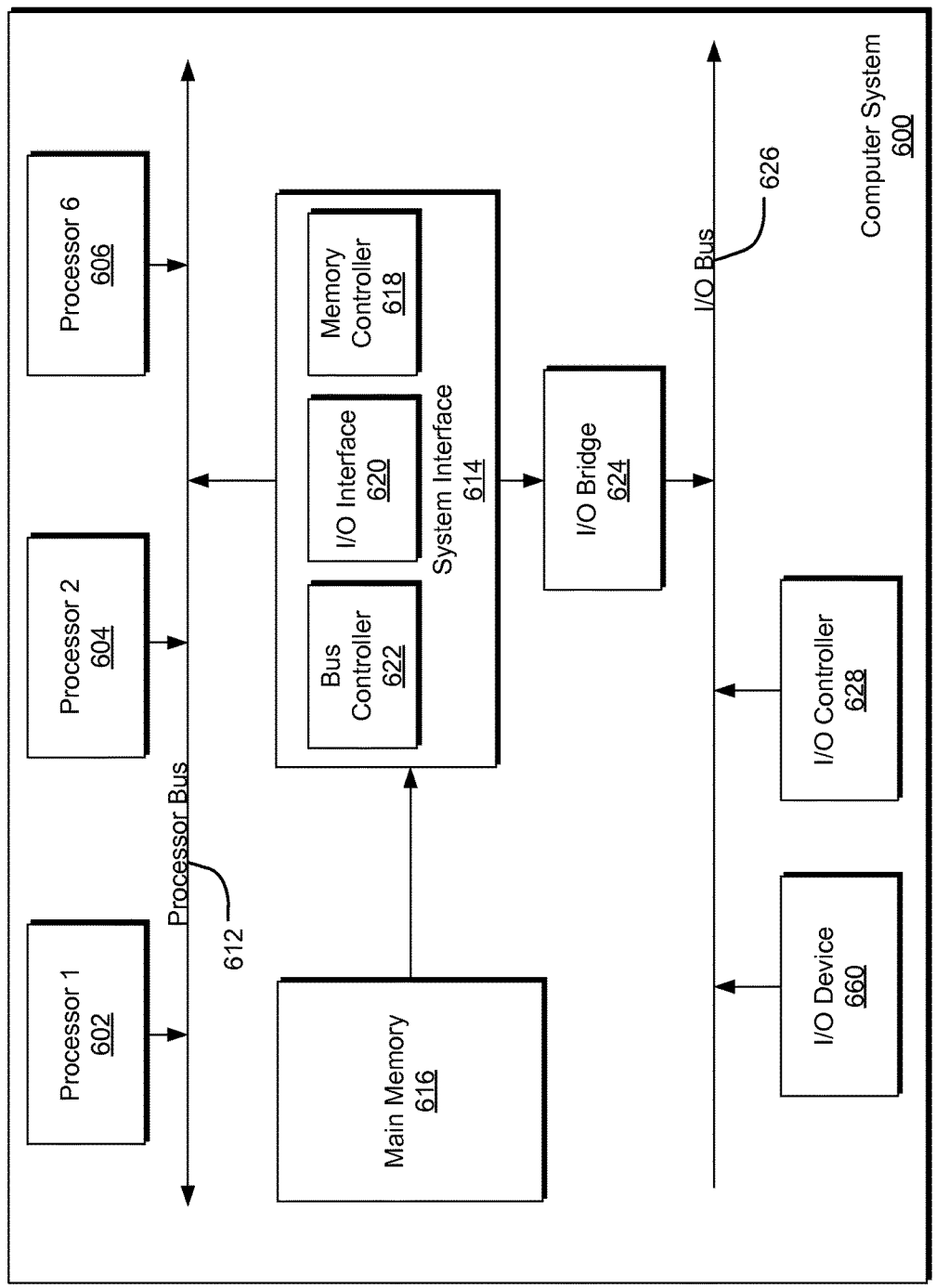
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the CDN DNS disclosed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for providing a source of content distribution from a content distribution network, the method comprising:
    receiving, at a server of the content distribution network, a request from a requesting device for content associated with a content distribution network;
    obtaining a Border Gateway Protocol (BGP) feed of route information, the BGP feed comprising at least one Internet Protocol (IP) address associated with at least one network external to the content distribution network;
    analyzing the BGP feed of route information to determine at least one egress port from the content distribution network to the at least one network external to the content distribution network;
    obtaining a business cost associated with transmitting content through the at least one egress port, wherein the business cost includes at least a monetary cost of transmitting the content through the at least one egress port;
    creating a first policy rule for selecting a source device within the content distribution network for providing content to the requesting device based at least on the BGP feed of route information and the business cost associated with transmitting content through the at least one egress port;
    determining that the requesting device is not identified as a customer of the at least one network external to the content distribution network;
    identifying the source device within the content distribution network for providing the requested content to the requesting device based at least on the first policy rule and the determination that the requesting device is not identified as a customer of the at least one network external to the content distribution network; and
    causing the identified source device to provide the requested content to the requesting device.

2. The method of claim 1, further comprising:
    receiving an Internal Gateway Protocol (IGP) feed of route information, the IGP feed comprising an identifier of at least one transmission route within the content distribution network, the identifier of the at least one transmission route associated with a content server of the content distribution network.

3. The method of claim 2, further comprising:
    creating a second policy rule for selecting a source device within the content distribution network for providing content to the requesting device based at least on the IGP feed of route information.

4. The method of claim 3 wherein identifying the source device operation further comprises basing the identification of the source device within the content distribution network for providing the requested content to the requesting device on the second policy rule.

5. The method of claim 1 wherein the business cost is indicative of a monetary price for transmitting content through the egress port and the first policy rule is based at least on the monetary price for transmitting content through the egress port.

6. The method of claim 3 wherein the second policy rule is based at least on a quality of service associated with the at least one transmission route within the content distribution network.

7. The method of claim 3 wherein the source device is selected from a plurality of content servers associated with a particular egress port of the content distribution network.

8. A content distribution network comprising:
    a plurality of content servers; and
    a content distribution network component including a processor configured to execute processor executable instructions stored on a processor-readable medium to:
        receive a request for content from a requesting device associated with a first external network to the content distribution network;
        access a database configured to store a Border Gateway Protocol (BGP) feed of route information, the BGP feed comprising at least one Internet Protocol (IP) address associated with the requesting device;
        analyze the BGP feed of route information to determine at least one egress port from the content distribution network to a second external network;
        obtain a business cost associated with the at least one egress port, wherein the business cost includes at least a monetary cost of transmitting the content through the at least one egress port;

create a first policy rule for selecting one of the plurality of content servers for providing content to the requesting device based at least on the BGP feed of route information and the business cost associated with the egress port;

determine that the requesting device is not identified as a customer of the second external network;

select the one of the plurality of content servers within the content distribution network for providing the requested content to the requesting device based on the first policy rule and the determination that the requesting device is not identified as a customer of the second external network; and cause the selected one of the content servers to provide the requested content to the requesting device.

9. The content distribution network of claim 8 wherein the database is further configured to store an Internal Gateway Protocol (IGP) feed of route information, the IGP feed comprising an identifier of at least one transmission route within the content distribution network from one of the plurality of content servers to the first external network.

10. The content distribution network of claim 9 wherein the content distribution network domain name server is further configured to:

create a second policy rule for selecting a source device within the content distribution network for providing content to the requesting device based at least on the IGP feed of route information.

11. The content distribution network of claim 10 wherein the selection of the one of the plurality of content servers within the content distribution network for providing the requested content to the requesting device is further based on the second policy rule.

12. The content distribution network of claim 8 wherein the business cost is indicative of a monetary price for transmitting content through the egress port and the first policy rule is based at least on the monetary price for transmitting content through the egress port.

13. The content distribution network of claim 8 wherein the content distribution network component is a domain name server of the content distribution network.

14. A system for operating a content distribution network, the system comprising:

a server comprising:
    a processor; and
    a computer-readable medium associated with the processor and including instructions stored thereon and executable by the processor to:
        receive a request for content from a requesting device associated with a first external network to a content distribution network;
        obtain Border Gateway Protocol (BGP) feed of route information associated with a second external network, the BGP feed comprising at least one Internet Protocol (IP) address associated with the requesting device and an egress port from the content distribution network to the second external network associated with the at least one IP address;
        determine at least one business cost associated with the at least one egress port, wherein the business cost includes at least a monetary cost of transmitting the content through the at least one egress port;
        create a first policy rule for selecting one of the plurality of content servers for providing content to the requesting device based at least on the business cost associated with the at least one egress port;
        determine that the requesting device is not identified as a customer of the second external network;
        select a content provider within the content distribution network for providing the requested content to the requesting device, wherein the selection of the content provider is based at least on the first policy rule and the determination that the requesting device is not identified as a customer of the second external network; and
        cause the selected content provider to provide the requested content to the requesting device.

15. The system of claim 14 wherein the content provider is a content server maintained by the content distribution network.

16. The system of claim 14 wherein the processor is further executable to:

receive an Internal Gateway Protocol (IGP) feed of route information, the IGP feed comprising at least one transmission route within the content distribution network from at least one content provider of the content distribution network to the egress port; and create a second policy rule for selecting a content provider within the content distribution network for providing content to the requesting device based at least on the IGP feed of route information, the second policy rule based on a shortest transmission path through the content distribution network.

17. The system of claim 14 wherein the business cost is indicative of at least one of a monetary price for transmitting content through the egress port, a quality of service associated with providing the content from the content provider to the requesting device or a business agreement between a content distribution network operator and a third party.

18. The method of claim 1 wherein the created first policy rule for selecting the source device is further based on one or more business agreements.

19. The method of claim 1, wherein the created first policy rule for selecting the source device overrides a lowest latency rule for selecting the source device for providing the content to the requesting device.

20. The method of claim 1, wherein a potential source device for providing the requested content to the requesting device is not identified as the source device when a monetary cost associated with providing the content from the potential source device exceeds a threshold.

* * * * *